(12) United States Patent
Keck

(10) Patent No.: US 6,814,358 B2
(45) Date of Patent: Nov. 9, 2004

(54) SEALING ARRAY

(75) Inventor: Matthias Keck, Renningen (DE)

(73) Assignee: Busak + Shamban Deutschland GmbH, Stuttgart (DE)

( * ) Notice: Subject to any disclaimer, the term of this patent is extended or adjusted under 35 U.S.C. 154(b) by 15 days.

(21) Appl. No.: 10/257,604

(22) PCT Filed: Apr. 20, 2001

(86) PCT No.: PCT/DE01/01515
§ 371 (c)(1),
(2), (4) Date: Oct. 15, 2002

(87) PCT Pub. No.: WO01/84022
PCT Pub. Date: Nov. 8, 2001

(65) Prior Publication Data
US 2003/0090069 A1 May 15, 2003

(30) Foreign Application Priority Data
Apr. 20, 2000 (DE) .......................... 100 19 567

(51) Int. Cl.[7] ................................ F16J 15/12
(52) U.S. Cl. .................. 277/638; 277/611; 277/644
(58) Field of Search .............................. 277/611, 638, 277/639, 644

(56) References Cited

U.S. PATENT DOCUMENTS

| 2,191,044 A | * | 2/1940 | Seligman | 165/167 |
|---|---|---|---|---|
| 2,345,515 A | * | 3/1944 | Tweedale | 277/638 |
| 2,815,973 A | * | 12/1957 | Jackson | 277/572 |
| 2,949,325 A | * | 8/1960 | Nenzell | 277/639 |
| 3,215,442 A | * | 11/1965 | Papenguth | 277/611 |
| 3,408,097 A | * | 10/1968 | Glasgow | 285/112 |
| 3,630,483 A | * | 12/1971 | Canalizo | 251/174 |
| 3,848,880 A | * | 11/1974 | Tanner | 277/584 |
| 3,869,132 A | * | 3/1975 | Taylor et al. | 277/608 |
| 4,468,042 A | * | 8/1984 | Pippert et al. | 277/638 |
| 4,813,608 A | | 3/1989 | Holowach | |
| 5,129,658 A | | 7/1992 | Berton | |
| 5,433,370 A | | 7/1995 | Halling | |
| 5,551,703 A | * | 9/1996 | Morvant | 277/584 |
| 5,799,954 A | | 9/1998 | Layer | |
| 5,913,522 A | * | 6/1999 | Koch | 277/610 |
| 6,224,065 B1 | * | 5/2001 | Smith | 277/611 |

FOREIGN PATENT DOCUMENTS

| DE | 1 917 990 | 10/1969 |
|---|---|---|
| DE | 37 08 421 | 10/1987 |
| DE | 39 03 780 | 8/1990 |
| DE | 39 18 891 | 9/1990 |
| DE | 44 08 246 | 9/1995 |
| DE | 195 03 285 | 8/1996 |

* cited by examiner

Primary Examiner—Alison K. Pickard
(74) Attorney, Agent, or Firm—Paul Vincent

(57) ABSTRACT

A sealing arrangement (14) has a housing gap, to be sealed, between two components (15, 16) and a seal (1) which consists of two interconnected sealing components (2, 3), a first extrusion-resistant, deformable sealing component (2) and a second more deformable sealing component (3). The first sealing component (2) has an abutment surface (6) facing the sealing surface (17) of the component (15), and a contact surface (9) for abutment on the other component (16). The second sealing component (3) abuts the first sealing component (2) and has an edge (4) projecting past the abutment surface (6). The first sealing component (2) can be pressed onto the sealing surfaces (17; 18) of the components (15, 16; 30, 31) to close the housing gap in response to system pressure. The second sealing component (3) can be sealingly pressed onto the sealing surfaces (17, 18). The sealing arrangement (14) is of simple construction and can produce an effective high pressure seal in Common Rail injectors or similar systems.

9 Claims, 2 Drawing Sheets

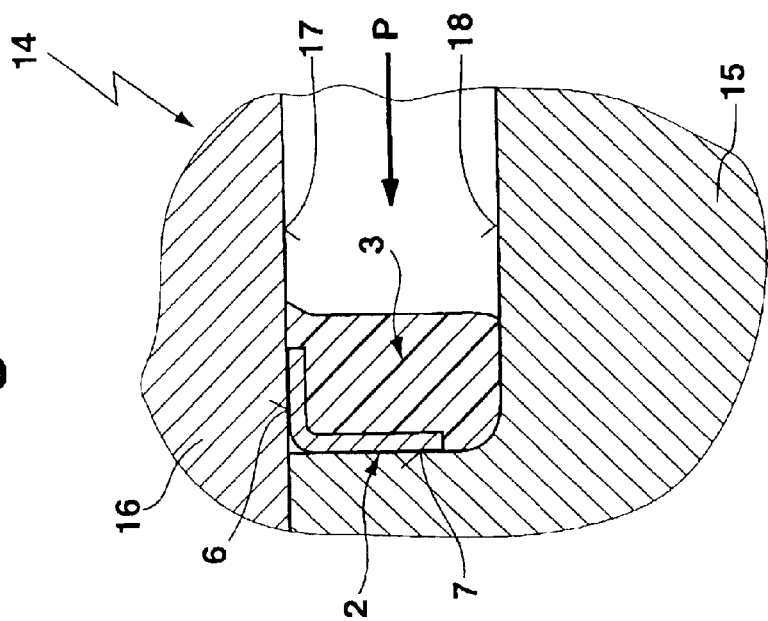
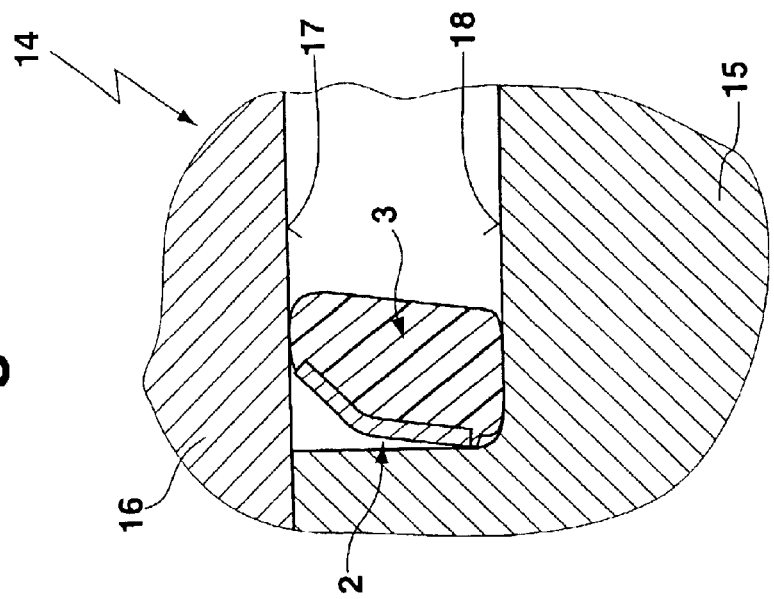
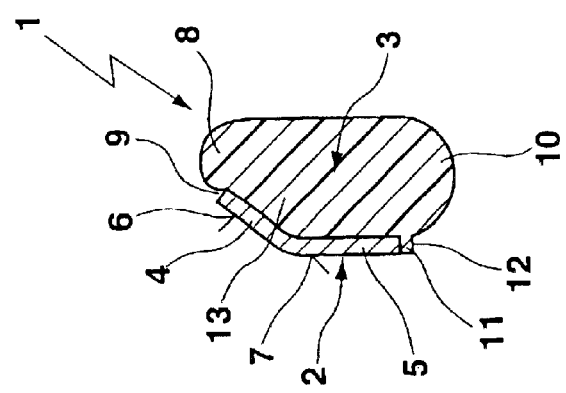

SEALING ARRAY

BACKGROUND OF THE INVENTION

The invention concerns a sealing arrangement for statically sealing a housing gap between two components, in particular, in response to pulsating high pressure of more than 1000 bars. This seal is suitable for applications where it is pressure-loaded by fluid system pressure such as in high pressure cleaners, injection systems, Common Rail injectors, and water jet cutters.

High-pressure diesel injection systems (Common Rail injectors) require static seals at different sealing points which must withstand high fuel system pressures (currently 1300 to 1600 bars with a tendency towards 2000 bars).

The seals of highly-filled PTFE, which have been used up to now, reach their limits at approximately 1600 bars, since extrusion occurs at higher pressures. Sealing rings of plastic materials with higher extrusion resistance than filled PTFE require high production accuracy for the sealing rings and/or the surrounding components and/or high surface quality all of which are disadvantageous with respect to costs and processing safety.

It is the object of the invention to produce a more effective high-pressure seal of simple construction for Common Rail injectors or similar systems.

SUMMARY OF THE INVENTION

This object is achieved in accordance with the invention through a sealing arrangement in accordance with the independent claim. The hard component is supported on the housing gap, closes it and prevents extrusion of a sealing component into that housing gap. The softer component is strongly deformed under existing system pressure and seals the housing gap. The cooperation between these two components produces high processing safety.

In one embodiment, the first sealing component is tensioned between an edge and a projecting step of the softer component. The hard sealing component is thereby held on the second sealing component and installation and assembly are facilitated. As an alternative to this snap connection, the components can be chemically bonded e.g. glued.

In another embodiment, the edge is curved. The curved edge can be pressed with increased force on the surface of the component to be sealed and deformed to thereby produce secure sealing.

The first (hard) sealing component is preferably L-shaped or formed from two legs subtending an angle to produce an effective support ring of simple construction. To facilitate assembly and increase the processing safety, it is appropriate to securely connect the two sealing components.

The first sealing component can be produced from plastic material or metal and the second sealing component can be produced from an elastomeric material.

BRIEF DESCRIPTION OF THE DRAWING

The schematic drawing shows two embodiments of the inventive sealing arrangement which are explained in the following description.

FIG. 1a shows a cross-section of the seal, which consists of two sealing components, before assembly;

FIG. 1b shows a cross-section of a sealing arrangement with installed seal according to FIG. 1a;

FIG. 1c shows the sealing arrangement according to FIG. 1b with applied system pressure;

DESCRIPTION OF THE PREFERRED EMBODIMENT

Figure 2A:
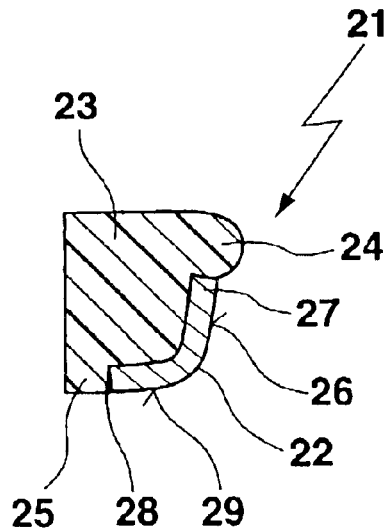
FIG. 2a shows a cross-section of another seal, which consists of two sealing components, before assembly.

FIG. 1a (production state) shows a seal 1 assembled from two interconnected annular sealing components 2 and 3. The first sealing component 2 is produced from a hard, extrusion-resistant material, e.g. from a bendable metal or sheet metal, while the second sealing component 3 consists of a soft, extrudable or even softer material. FIG. 1a shows the unloaded state before mounting of the seal 1, whereby the sealing components 2 and 3 are shown in the manufacturing state. The first sealing component 2 is L-shaped, having two legs 4 and 5 which form an abutment surface 6 facing the sealing surface of a component (see FIG. 1b) and a contact surface 7. One side of this L-shape is positively connected to a portion of the second sealing component 3. A curved edge 8 of the second sealing component 3 projects past a leg end 9 and the contact surface 7. Another curved edge 10 also projects past another leg end 11, with the second sealing component 3 having a greater longitudinal extension than the first sealing component 2. This first sealing component 2 abuts a step 12 of the second sealing component 3 via the leg end 11, and the leg 4 abuts on a shoulder 13 of the second sealing component 3.

FIG. 1b shows the assembled state of the slightly oversized seal without pressure load in a sealing arrangement 14. While the sealing component 2 changes only slightly, the sealing component 3 deforms considerably more such that the seal is fixed in the cavity. The seal 1 is pressed into the cavity and abuts the side walls 17, 18 of the cavity which is formed by the components 15 and 16. Fixation can be effected through slight pre-pressure or by using an assembling pressure which is less than the fluid system pressure. A mechanical pre-pressure, exerted e.g. by a stamp, is also feasible instead of a hydraulic assembly pressure.

After installation and under pressure load (operating state) the sealing components 2 and 3 assume the shape of FIG. 1c. A sealing arrangement 14 has a profiled component 15 and component 16 such that a housing gap is produced between the component 15 and the component 16 which must be sealed. Although the first sealing component 2 deforms, extrusion into the housing gap does not occur. The sealing component 2 closes the housing gap and abuts the softer second sealing component 3 which assumes the actual sealing function. The angle between the legs can change with the system pressure. The first sealing component 2 prevents extrusion into the housing gap. The seal 1 is formed such that the harder sealing component 2 closes the housing gap in response to system pressure of a fluid (e.g. fuel of an injector or hydraulic oil) and prevents extrusion of the soft sealing component 3 even for a dynamically changing housing gap width ("breathing gap"). The leg 5 of the first sealing component 2 thereby abuts on the component 15 and the leg 4 on the component 16. Abutment via the abutment surface 6 is effected in response to pressures exerted on the component 3 during assembly and is increased by the existing system pressure. The gap between the sealing component 2 and the component 15, which may be tolerance-related, is closed with the first pressure load exercised by high pressure P. The second sealing component 3 transfers the system pressure to the first sealing component 2 and deforms such that the original gaps remain closed to always ensure abutment of the second sealing component 2, via the abutment surface 6, on the component 16. The sealing element 3 is deformed, compressed and pressed into the free space between the sealing surface 17 and the component surface 18. The seal is fixed during operation e.g. in response to pulsating system pressure P. The fluid produces hydraulic sizing and shaping (hydroforming) of the seal, and mainly of the elastic sealing component 3.

An unloaded seal 21 of FIG. 2a is formed from the first annular sealing component 22 and the second annular sealing component 23. The second sealing component 23 is substantially rectangular with a curved edge or projection 24 and a step 25 such that the first L-shaped sealing component 22 is partially enclosed and bordered. The edge 24 projects beyond an abutment surface 26. Leg ends 27 and 28 join the step 25 and the edge 24 to provide flat abutment or flat contact between the two sealing components 22 and 23. A contact surface 29 of the first sealing component 22 is provided for abutment on a profiled component.

Figure 2C:
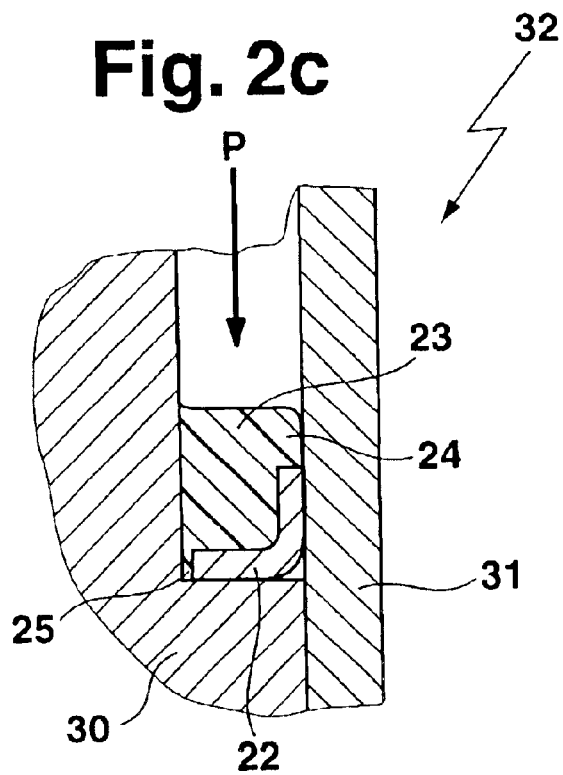
FIG. 2c shows a cross-section of a sealing arrangement with installed seal according to FIG. 2a with applied system pressure.

FIG. 2c again shows deformation of the first sealing component and the material flux of the second sealing component 23 when the static seal 21 is inserted between two components 30 and 31 for sealing a housing gap and exposed to a high pressure P acting in the axial direction. This sealing arrangement 32 can be used e.g. in Common Rail injectors. In particular, the edge 24 is deformed such that a varying housing gap width between the components 30 and 31 is compensated for and always sealed. The second soft sealing component 23 assumes the actual sealing function while the hard sealing component 22 prevents extrusion at the housing gap.

List of Reference Numerals 1. seal
2 first sealing component
3 second sealing component
4 leg
5 leg
6 abutment surface
7 contact surface
8 curved edge
9 leg end
10 curved edge
11 leg end
12 step
13 shoulder
14 sealing arrangement
15 component
16 component
17 sealing surface
18 component surface
21 seal
22 first sealing component
23 second sealing component
24 curved edge
25 step
26 abutment surface
27 leg end
28 leg end
29 contact surface
30 component
31 component
32 sealing arrangement
P high pressure

I claim:

1. A seal for sealing system pressure from a housing gap between a first and a second housing member, the first member having a first sealing surface at a first member side of the gap and the second member having a second sealing surface at a second member side of the gap, the seal comprising:

a first extrusion-resistant, flexible sealing component having a vault-shaped cross section, said first component having a first leg which can cooperate with the first sealing surface and a second leg which can cooperate with the second sealing surface; and a second, deformable sealing component disposed on said first sealing component, said second sealing component being structured and dimensioned to press against the first and the second sealing surfaces in response to the system pressure to seal the gap, wherein said first leg and said second leg subtend an angle at a side of said first sealing component facing said second sealing component, said angle decreasing in response to system pressure until said first leg seats flatly against said first sealing surface and said second leg seats flatly against said second sealing surface.

2. The seal of claim 1, wherein said second sealing component further comprises a step disposed proximate said contact surface of said first sealing component to capture said first sealing component between said step and said edge of said second sealing component.

3. The seal of claim 1, wherein said edge is curved.

4. The seal of claim 1, wherein said first sealing component has an L-shaped cross-section.

5. The seal of claim 1, wherein said first sealing component is made from plastic.

6. The seal of claim 1, wherein said first sealing component is made from metal.

7. The seal of claim 1, wherein said second sealing component is made from an elastomeric material.

8. The seal of claim 1, wherein said angle is an obtuse angle prior to application of system pressure.

9. The seal of claim 8, wherein said angle is substantially equal to 90 degrees after application of system pressure.

* * * * *